(12) United States Patent
Alapuranen

(10) Patent No.: US 8,660,136 B2
(45) Date of Patent: Feb. 25, 2014

(54) MEASUREMENT COORDINATION FOR DYNAMIC SPECTRUM ACCESS MEASUREMENTS IN A TIME DIVISION DUPLEX SYSTEM

(75) Inventor: Pertti Alapuranen, Deltona, FL (US)

(73) Assignee: XG Technology, Inc., Sarasota, FL (US)

( * ) Notice: Subject to any disclaimer, the term of this patent is extended or adjusted under 35 U.S.C. 154(b) by 141 days.

(21) Appl. No.: 13/530,406

(22) Filed: Jun. 22, 2012

(65) Prior Publication Data
US 2013/0021914 A1    Jan. 24, 2013

Related U.S. Application Data

(60) Provisional application No. 61/509,647, filed on Jul. 20, 2011.

(51) Int. Cl.
*H04B 7/212*    (2006.01)

(52) U.S. Cl.
USPC .......................................................... 370/442

(58) Field of Classification Search
None
See application file for complete search history.

(56) References Cited

U.S. PATENT DOCUMENTS

| | | | |
|---|---|---|---|
| 2006/0286986 A1* | 12/2006 | Kim et al. ..................... | 455/450 |
| 2010/0035629 A1 | 2/2010 | Soliman | |
| 2010/0097952 A1* | 4/2010 | Mchenry et al. ............. | 370/252 |
| 2010/0105332 A1 | 4/2010 | McHenry et al. | |
| 2011/0194538 A1* | 8/2011 | Zheng et al. .................. | 370/335 |
| 2012/0120887 A1* | 5/2012 | Deaton et al. ................. | 370/329 |

* cited by examiner

*Primary Examiner* — Anh-Vu Ly
(74) *Attorney, Agent, or Firm* — Dennis L. Cook, Esq.

(57) ABSTRACT

The invention disclosed in this application describes methods to coordinate spectrum measurement periods in access points or base stations in a time division duplex (TDD) system where the super frame is divided into uplink and downlink portions for use in cognitive radio systems.

3 Claims, 1 Drawing Sheet

MEASUREMENT COORDINATION FOR DYNAMIC SPECTRUM ACCESS MEASUREMENTS IN A TIME DIVISION DUPLEX SYSTEM

CROSS-REFERENCE TO RELATED APPLICATION

The present application claims the benefit of previously filed Provisional Patent Application, Ser. No. 61/509,647 filed Jul. 20, 2011.

FIELD OF THE INVENTION

This invention applies to the field of cognitive radio systems and more specifically describes methods to coordinate spectrum measurement periods in access points (AP) or base stations (BS) in a time division duplex (TDD) system where the frame period is divided into uplink and downlink portions.

BACKGROUND OF THE INVENTION

Modern cognitive radio technology allows dynamic spectrum sensing, spectrum management, mobility and spectrum sharing, to mention a few. Classical cognitive radios change frequency channels when the interference level, or other parameters associated with operation, can be improved by moving to another frequency. Recent signal processing and multiple antenna technologies, however, allow expanded cognitive operation where receiver algorithms and transmit waveforms are dynamically adjusted for an operational environment.

Spectrum is a limited resource. A large amount of spectrum is required to deliver services that are associated with modern wireless personal communications. Typical examples are smart phones, wireless internet to laptops, and other such devices. These services consume a large amount of spectral resources causing both financial and spectrum policy issues.

Typically, these services are provided using licensed spectrum. The financial burden from licensing is billions of dollars, even for a relatively small amount of spectrum when compared to freely available unlicensed spectrum. The licensing, however, is required to make sure that current 1 to 4G radio technologies have the coordinated access they require to deliver a quality of service that is adequate for the end user application.

Currently in the United States there are several hundred MHz of unlicensed spectrum that can be used for delivering wireless services to consumers, however, traditional radio technologies typically suffer from interference from uncoordinated access from other unlicensed users. A novel radio technology is required that can deliver service while being highly resistant to interference and while also creating as little interference as possible to other users in the unlicensed band.

A state of the art cognitive radio network can use multiple frequency channels or bands automatically. This ability to create a network without detailed operator configuration allows for efficient use of spectrum, cost, and time, and also an efficient network deployment.

Self organizing and cognitive capabilities, however, require that the Access Points (AP) or Base Stations (BS) are able to measure the same and other network Access Points or Base Stations. In a TDD system a coordination of listening times is required among collocated transmitters. For example, APs that are closer than some predetermined distance need to be restricted from transmitting during measurement periods in a measured channel to avoid receiver front-end dynamic range limitations. The front-end overloading can happen if one device is transmitting on a frequency that is close to a frequency that the other device is using to receive weak signals.

BRIEF SUMMARY OF THE INVENTION

This invention describes methods to coordinate spectrum measurement periods in access points or base stations in a time division duplex (TDD) system where the super frame is divided into uplink and downlink portions for use in cognitive radio systems.

For a fuller understanding of the nature and objects of the invention, reference should be made to the following detailed description taken in connection with the accompanying drawing.

DESCRIPTION OF THE DRAWINGS

For a fuller understanding of the nature and objects of the invention, reference should be made to the accompanying drawing, in which.

DETAILED DESCRIPTION OF THE INVENTION

To select a frequency band and channel the preferred embodiment's AP and BS have to compute performance metrics for available bands and channels. These performance metrics are used for RF channel selection purposes. To compute performance metrics the BS and AP needs to scan available channels for activity and detect signals from other intra system devices, and devices from other systems.

A channel availability is determined based on measurements of channel power over a predefined measurement period. Based on the RSSI measurements a mean and variance of the RSSI (Received Signal Strength Indication, dB) are both computed. For each sample the maximum RSSI level is used as a sample value.

To compare the capacity available on different channels the BS computes statistics based on a noise floor analysis. The noise floor is calculated as $Nfloor = \mu_{RSSI} + N^*\sigma_{RSSI}$ where $\mu_{RSSI}$ is the mean of measurements and $\sigma_{RSSI}$ is the variance of measurements.

The coefficient N is typically 3 but can be chosen to adjust the minimum population distance from the mean $\mu_{RSSI}$.

| Probability | Coefficient N |
| --- | --- |
| 50% | $\sqrt{2}$ |
| 75% | 2 |
| 89% | 3 |
| 94% | 4 |
| 96% | 5 |
| 97% | 6 |

For example, a default value of 3 ensures that 89% of the samples of RSSI measurements are below three standard deviations from the mean.

The preferred embodiment system detects it's own system beacons thus having information on whether there are other APs or BSs of the same systems in the band. The detection threshold for the preferred embodiment should be −60 dBm for same system co-channel energy.

Figure 1:
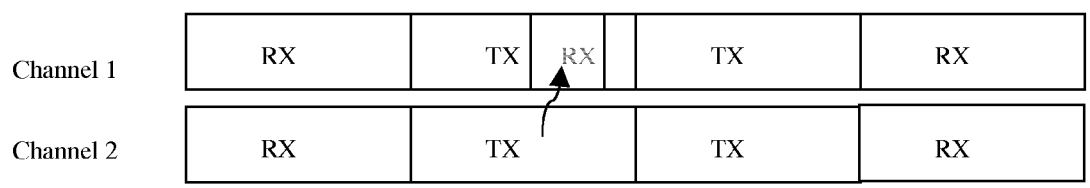
FIG. 1 is a diagram showing two conflicting channels.

The measurement of other preferred embodiment APs and BSs requires measurements during the TX period of a TDD super frame, i.e. the network device has to measure other APs and BSs by turning the receiver on and the transmitter off during its transmit portion of TDD frame. This operation requires coordination when there are multiple channels served by a single device, or a cluster of devices that are co-located. FIG. 1 shows the RX portion of an AP on channel 1 trying to measure while a co-located device on channel 2 is transmitting. This situation can lead to RF front-end overload due to limited dynamic range.

Figure 2:
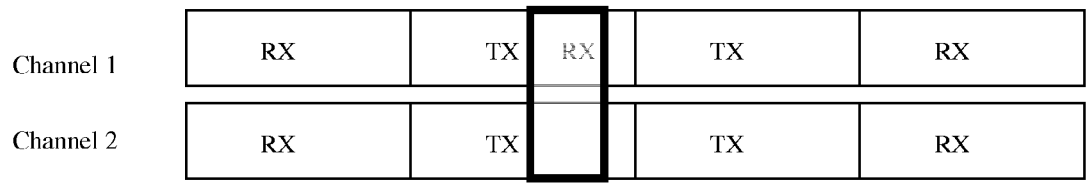
FIG. 2 is a diagram showing two coordinated channels.

FIG. 2 show a case where co-located devices coordinate listening times thus avoiding RF front-end overload situations.

In a multi-band radio network the bands are separated by tens or hundreds of MHZ or even multiple GHz. For example, a lower band operating at 900 MHz can be independently operating with a 5.7 GHz upper band in the same device due to the large separation of frequencies. RF signals in these bands can be isolated using a simple diplexer design, thus there is no need for coordination between frequency bands. For this reason coordination is only required when a frequency delta between channels served by co-located devices is less than some predetermined threshold.

A device that needs to measure spectrum needs to have information regarding other devices that are co-located (in a RF propagation sense). The information of co-located devices is stored in a co-located devices table (CLD-TABLE). This table contains service access points (MAC, IP address, port) of devices that need to be coordinated when the device wants to measure during a period that is normally its TDD TX portion.

The CLD-TABLE can be manually provisioned by an operator or can be created automatically. The manual provisioning method consists of a means to fill in the table information regarding service access points of the co-located devices. This method works for systems that have many devices co-located while the configuration or location is changing. For example, a three sector moving system where each sector is aware of the existence of the two other sectors and can use the static configuration for the two other sectors that are permanently attached to a common structure or vehicle.

The CLD-TABLE can also be created automatically by scanning beacons from infrastructure elements (AP, BS) and then filling the information of the detected devices into the table. The scanning is done for all channels that are in one band and within a predefined frequency delta. The detection threshold for the preferred embodiment should be −60 dBm for same system co-channel energy. If the average beacon level is stronger than this then the information about the device is filled into the CLD-TABLE.

A device that needs to measure signals of other infrastructure elements (AP, BS) sends a request for listening (RFL) time message to all devices that are on the list of co-located devices. A request contains the super-frame number, the time of listening start in the super frame and the time of listening end in the super frame. The super-frame time is relative to common timing, i.e. typically a next 1 second GPS pulse.

Devices who receive a request for listening (RFL) message check their CLD-TABLEs and transmit additional requests to other devices that need coordination but were not included in original RFL message. After getting an indication of listening period (IFL) message from devices on the original RFL list the device can schedule a listening time in the time defined in the original request. In the situation where a response is not received from some devices on the list the requesting device can use the listening time while risking front-end overload, or can re-transmit the RFL message. If a device returns an indication with no listening time specified then the requesting device has to restart the process.

The request and indication messages between infrastructure elements can be communicated using wired or wireless connection. The system should check the wired or wireless backhaul connection to the destination before sending coordination messages. If a wired connection does not exist then the system can use the wireless link by using random access slots between APs or BSs. The latter method should be used if a backhaul connection does not exist. To reduce overhead the indication messages (IFL) should be sent on the last downlink timeslots available.

Since certain changes may be made in the above described system and method for measurement coordination for dynamic spectrum access measurements in a time division duplex cognitive radio system without departing from the scope of the invention herein involved, it is intended that all matter contained in the description thereof or shown in the accompanying figure shall be interpreted as illustrative and not in a limiting sense.

What is claimed is:

1. A method to coordinate spectrum measurement periods by access points or base stations for use in a time division duplex cognitive radio system where a media access control protocol super frame is divided into uplink and downlink portions comprising:

first each of said access points or base stations constructing and storing a collocated device table containing service access information of other said access points or base stations within a predetermined RF propagation strength area and within a predefined frequency delta within a frequency band;

then one of said access points or base stations coordinating a spectrum measurement period by sending a first request for listening message indicating a listening period identified by a super frame number and time of listening start and time of listening end during a transmission time period to each of said access points or base stations on said coordinating access point or base station's collocated device table;

then each of said access points or base stations that received said first request for listening message checking said access point or base station's collocated device table and transmitting a second request for listening message indicating said listening period to any other access point or base station within a predetermined RF propagation strength area and within a predefined frequency delta within a frequency band that was not sent said first request for listening message;

then each of said access points or base stations that received said first or second request for listening messages sending an indication of listening period message indicating said listening period and shutting down transmission during said indicated listening period;

wherein, upon receiving said indication of listening period messages indicating said listening period from said access points or base stations within a predetermined RF propagation strength area and within a predefined frequency delta within a frequency band, said coordinating access point or base station, and any other access points or base stations that are also measuring spectrum, shutting down transmission and beginning receiving and measuring spectrum during said indicated listening period; and, wherein, upon not receiving said indication of listening period messages indicating said listening period from said access points or base stations within a predetermined RF propagation strength area and within a predefined frequency delta within a frequency band, said coordinating access point or base station resending said first request for listening message indicating a new listening period identified by a super frame number and time of listening start and time of listening end during a transmission time period to each of said access points or base stations on said coordinating access point or base station's collocated device table.

2. The method to coordinate spectrum measurement periods of claim 1 wherein said constructing of said collocated device table is accomplished manually by an operator.

3. The method to coordinate spectrum measurement periods of claim 1 wherein said constructing of said collocated device tables is accomplished automatically by said access points or base stations by scanning beacons containing service access information transmitted from said access points or base stations and filling said service access information into said collocated device tables.

* * * * *